Nov. 3, 1970              E. J. CHURCHILL                3,537,192
           APPARATUS FOR DEMONSTRATING PRINCIPLES OF
                    ELECTROMAGNETIC INDUCTION
Filed Jan. 11, 1968                                 2 Sheets-Sheet 1

INVENTOR
Elvin Joe Churchill
BY: Charles H. Redman
Atty.

INVENTOR
Elvin Joe Churchill

BY: Charles H. Redman
Attys.

United States Patent Office 3,537,192
Patented Nov. 3, 1970

3,537,192
APPARATUS FOR DEMONSTRATING PRINCIPLES OF ELECTROMAGNETIC INDUCTION
Elvin Joe Churchill, A6, R.R. 4, Macomb, Ill. 61455
Filed Jan. 11, 1968, Ser. No. 697,151
Int. Cl. G09b 23/18
U.S. Cl. 35—19      4 Claims

ABSTRACT OF THE DISCLOSURE

Experimental apparatus for use in demonstrating and teaching various principles of electromagnetic induction. The apparatus comprises permanent magnet means which may be released for free-fall through individual wire wound test coils having differing characteristics. The electromotive force induced in each coil is measured by an oscilloscope, and the resultant data is plotted to determine the mathematical relationship between the electromotive force and various parameters. A test coil and oscilloscope are used to measure the relative velocity of the falling magnet for demonstrating Lenz's law through the application of the principle of conservation of energy.

---

This invention relates in general to teaching apparatus, and in particular to apparatus for teaching principles of electromagnetic induction. More particularly, this invention relates to apparatus for experimentally determining the mathematical relationships between the electromotive force induced in a coil of wire, and various parameters of the coil and magnetic field, thus demonstrating Faraday's laws of electromagnetic induction, and Lenz's law relating to the direction of an induced current.

The principles of electromagnetic induction are one of the basic phenomena taught and demonstrated in most high school and college physical science and physics courses. These principles are also taught and demonstrated in many electronic trade schools where the value of a solid foundation in basic electromagnetic theory is appreciated. The basic theory of electromagnetic induction is a prerequisite for most additional studies in electronics, electric motor design, and electrical generation equipment, all of which are commonly taught in engineering colleges.

Too often, the theory of electromagnetic induction is taught and demonstrated on a blackboard, the actual induction phenomena never being visually observed or measured by the student. This leads to an uninteresting and dull introduction to a subject which can be most exciting and stimulating when the principles connected therewith are introduced in a demonstrable, visually-stimulating manner.

The apparatus of this invention may be used to experimentally demonstrate various mathematical relationships and principles connected with Faraday's laws of electromagnetic induction, and Lenz's law relating to the direction of an induced current. In addition, the apparatus can be used to: (a) determine the value of gravity to two significant figure accuracy; (b) demonstrate the superposition of wave pulses on an oscilloscope screen; and (c) investigate the relationship between the electromotive force induced in a coil of wire, and the radius of the coil.

The apparatus for performing these demonstrations and experiments generally comprises a main vertical support column having a guide and indicia therealong. The guide includes simple means for supporting various wire test coils each of which comprise a secondary or induced circuit for a permanent magnet. Each of the wire coils have a different physical characteristic such as a different number of turns or a different diameter. The permanent magnet is dropped through the guide from a given reference point and as it passes through the particular coil being tested, the electromotive force induced therein is indicated by an oscilloscope to which the coil is coupled. Each of the test coils may be shifted to various locations along the guide, and permanent magnets of varying flux density may be used in the experiments.

Accordingly, the primary object of this invention is to provide apparatus for teaching and demonstrating various principles of electromagnetic induction.

It is also an object of this invention to provide experimental teaching apparatus for demonstrating Faraday's laws of electromagnetic induction, and Lenz's law for the direction of an induced current.

An additional object of this invention is to provide apparatus for experimentally determining the mathematical relationship between the electromotive force induced in a coil of wire, and the number of wire turns on the coil.

Another object of this invention is to provide apparatus for experimentally determining the mathematical relationship between the electromotive force induced in a secondary circuit and the relative speed of an inducing permanent magnet.

Another object of this invention is to provide experimental electromagnetic induction apparatus for demonstrating Lenz's law through the application of the principle of the conservation of energy.

An additional object of this invention is to provide experimental electromagnetic induction apparatus for determining the value of gravity to two significant figure accuracy.

These and other objects of this invention will become apparent upon an examination of the following description taken in conjunction with the accompanying drawings wherein.

Figure 4:
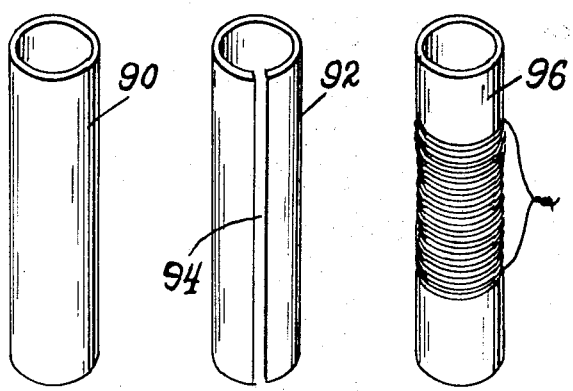

FIG. 4 includes perspective views of several test elements of the invention used to demonstrate Lenz's law.

Figure 5:
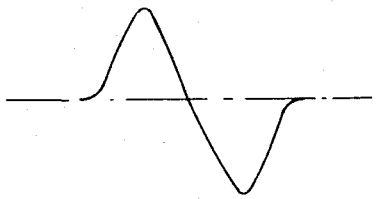
Figure 6:
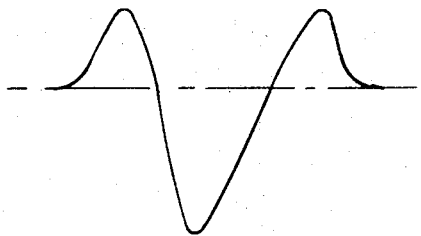

FIGS. 5 and 6 are typical curves traced on an oscilloscope showing the electromotive force induced in the secondary circuit during the experiments.

Figure 7:
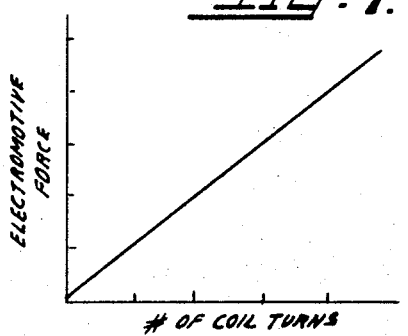
Figure 8:
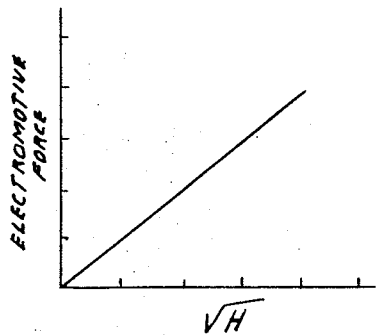

FIGS. 7 and 8 are plotted examples of two mathematical relationships determinable with the experimental apparatus of the invention.

Figure 1:
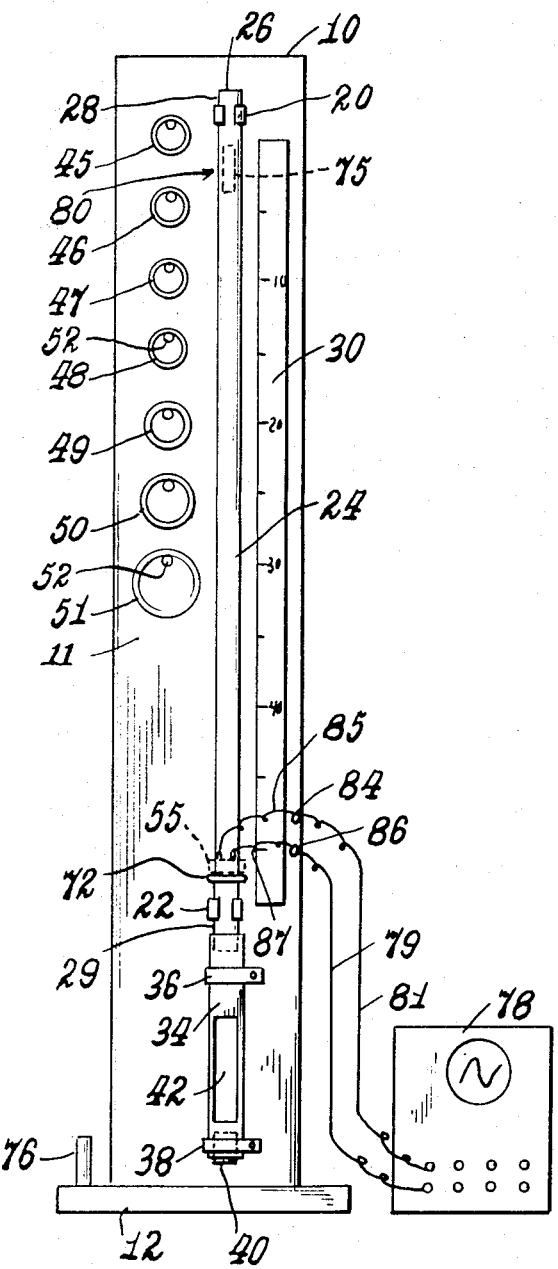
FIG. 1 is a front elevational view of the electromagnetic induction apparatus of the invention showing the test coils in their storage locations.
Figure 2:
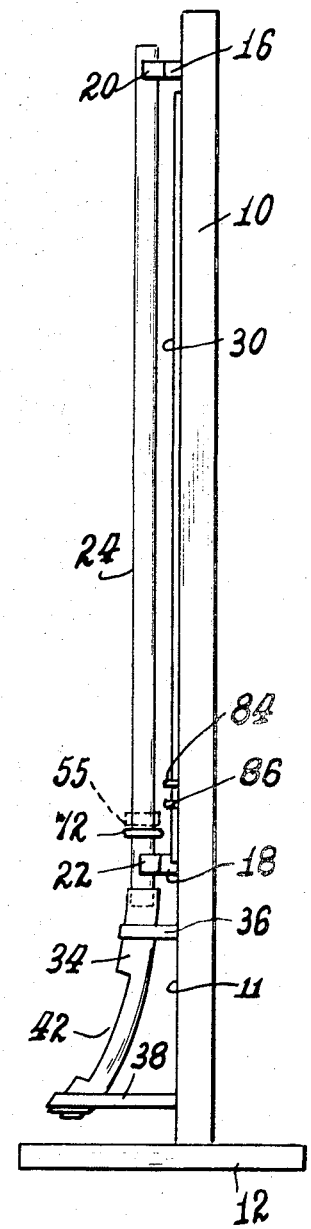
FIG. 2 is a side elevational view of the induction apparatus.

Referring now to FIGS. 1 and 2 of the drawings, the experimental electromagnetic induction apparatus comprises a substantially vertical main support column 10 having a front face 11 and a suitable base 12 for lending good stability to the main column. Column 10 has a first clip spacer 16 fastened adjacent the upper end thereof, and a second clip spacer 18 fastened substantially below the first spacer, but above the base of the column. Each of the spacers terminate in a resilient spring clip, 20 and 22 respectively, which are thus positioned away from the surface of front face 11.

A hollow tube 24 forming a guide for a freely falling permanent magnet is secured to the column by clips 20 and 22. Tube 24 includes an opening 26 extending through its entire length and has an upper end 28 which extends above clip 20 and a lower end 29 which terminates below clip 22.

The hollow tube serves as a guide for the permanent magnets which are dropped therethrough, and the test coils are supported about the outside of tube in a manner to be described below. Thus, the electromotive force is induced in the coils by a magnetic field which must pass through the tube walls. Consequently, the tube must be fabricated of magnetically nonpermeable material. Suitable materials for fabrication of tube 24 are translucent plastic or glass, each of which have the additional advantage of permitting observance of the falling magnet.

A magnet receptacle 34 is secured over the lower end 29 of tube 24 and is fastened to the main support column 10 by a pair of clamps 36 and 38. The receptacle is fabricated of resilient material such as rubber which is sealed at the lower extremity by a rubber plug 40. A window 42 is provided for recovering the magnet after its free fall has terminated. The magnet may then be dropped through the upper end of the tube for the next step in this particular experiment.

Indicia means 30, such as a metric scale ruler, is affixed to the front face of the main support column adjacent the hollow tube. The indicia extends substantially the entire length of the tube so that the distance between any two points therealong may be accurately determined.

A plurality of wire coils wound around bobbin-like forms such as coils 45, 46, 47, 48, 49, 50 and 51, may be stored on appropriate pegs 52 extending from the front face of the main support column. Each of coils 45, 46, 47 and 48 contain a different number of wire turns thereon, while coils 49, 50, and 51 have the identical number of wire turns, but different diameters.

Figure 3:
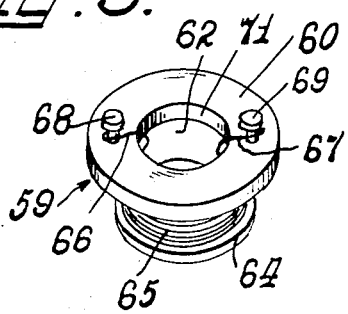
FIG. 3 is a perspective view of a typical induction coil showing the turns of wire wrapped about an appropriate bobbin and connected to the coil binding posts.

As best seen in FIG. 3, a coil bobbin 59 defines a generally toroidal shaped wire wound coil with the terminal ends extending onto binding posts for ease of connection. More particularly, each coil form comprises a flat top flange 60, connected by a circular hub 62 to a lower flange 64. A length of wire 65 comprising many wire turns is provided on each coil form between the flanges, each terminal end 66 and 67 being permanently connected to binding posts 68 and 70 located on top flange 60. As can be observed in FIG. 3, each coil form includes a center aperture 71 which is sufficiently large to easily slip over guide tube 24.

By way of example, coils 45, 46, 47 and 48 may be wound with #40 wire so that each wire coil samples the same part of the magnetic field. Coil 45 may have 50 turns of #40 wire, while coil 46 may have 100 turns; coil 47, 150 turns; and coil 48, 200 turns of #40 wire. Each of the coils 49, 50 and 51 have identical number of wire turns, for example, 100 turns of #40 wire, but coil 50 has a larger diameter than coil 49, and coil 51 has a larger diameter than 50. Thus, the induced electromotive force for coils of varying diameter can be easily compared.

A coil (shown in dotted lines at 55) is properly positioned on guide tube 24 by removing the guide tube from its upper clip 20, passing the particular coil being tested over the top 26, and moving the coil to the lower end. A large rubber grommet 72 which fits snugly over the outer surface of the tube is located adjacent the lower end. This grommet may be manually urged along the tube to a position whereat it is desired to test a particular coil. The test coil is vertically supported on the grommet while a magnet 75 is released from the level of reference point 80.

Binding posts 84 and 86 are permanently secured along one side of the front face of main column support 10. Electrical conductors 85 and 87 are fastened to these binding bosts and to binding posts 68 and 69 of the coil being tested. As will be described below, additional conductors connect binding posts 84 and 86 to an oscilloscope 78 for indicating the alectromotive force.

Magnet 75 is a permanent magnet having a circular cross-section and a diameter sufficiently small so that it may pass readily through the interior 26 of the guide tube in a free-fall manner. The apparatus includes a second permanent magnet 76, each of the magnets having identical shapes but differing flux densities thereby allowing investigation of the relationship between varying flux densities and a single test coil.

Turning now to FIG. 4, apparatus for demonstrating Lenz's law for the direction of an induced current in a coil, and related phenomena, is shown. The apparatus includes a continuous copper pipe 90 having an inner diameter greater than the outer diameter of the guide tube. The pipe may be placed on the glass tube directly above a test coil, also being supported by the grommet. Two additional members for demonstrating the related phenomena are a copper pipe 92 having similar dimensions as copper pipe 90, but with a slit 94 extending its entire length, and a wire-wound solenoid 96 having the same length as the copper pipe. The free ends of the solenoid wire are shorted together.

Oscilloscope 78 (FIG. 1) is provided for indicating the electromotive force induced into the particular coil being tested. The oscilloscope is semipermanently connected to binding posts 84 and 86 by electrical conductors 79 and 81. As the magnet is dropped through the guide tube from the reference point, an electromotive force will be induced in the coil as the magnetic field passes through. The value of the electromotive force is indicated on the screen of the oscilloscope and may be noted for plotting a curve or graph as will be described below.

The preferred embodiment of the experimental apparatus has been described in detail, now a brief description of the more important experiments capable of being performed with the apparatus, and the method of performance, will be provided.

The first experiment involving Faraday's laws is to determine the mathematical relationship between the electromotive force induced in a coil of wire and the number of wire turns on the coil. The strength of the magnetic field, and the velocity of the magnet through the coil must be held constant. Thus, the same permanent magnet (75) is used for each step, and it is always dropped from a given reference point 80 adjacent the top of the tube 24. Each of the coils being tested are placed, one at a time, on the rubber grommet 72, always at the same location so that the free-fall distance of the magnet is constant. The magnet, falling through a constant free-fall distance from the time it is released until it passes through the coil, attains a gravity induced constant velocity.

Coils 45, 46, 47 and 48, each having a differing number of wire turns, are tested one at a time. Each coil is placed on the test apparatus and is coupled to the oscilloscope by wires 85, 87, binding posts 84, 86, and wires 79, 81. The magnet is dropped from reference point 80 through the tube 24 and is successively retrieved through window 42. The oscilloscope is preferably set at a sweep rate of 10 c.p.s., and the resultant trace is noted. The amplitude of the trace is a measure of the electromotive force induced in the particular coil. A typical trace produced by one coil may be seen in FIG. 5. A plotted graph of the electromotive force as a function of the number of coil turns, (FIG. 7) shows the relationship to be one of direct proportion.

Another experiment involving Faraday's laws which may be performed with the apparatus is to determine the mathematical relationship between the electromotive force induced in a coil and the velocity of a magnetic field passing therethrough. For this test, the strength of the magnet and the parameters of the coil remain constant. The velocity of the magnet as it passes through the coil is varied by altering the vertical location of the coil on guide tube 24 by moving grommet 72 up or down, and always releasing the magnet from the same reference position 80.

To investigate the above relationship, it is necessary to determine the velocity of the magnet when the maximum amplitude, corresponding to the maximum induced electromotive force, is observed on the oscilloscope screen. Neglecting friction, the velocity of the falling magnet can be computed by the well-known formula, $V = \sqrt{2gH}$, where H is the distance the magnet falls when it induces the maximum electromotive force. To determine this distance, the relative position of the magnet and coil when the maximum electromotive force is being induced must be pinpointed.

The relative positions are pinpointed by serially connecting two identical coils and varying the distance of separation between them over the range of .5L to 1.5L where L equals the length of the magnet. Properly connected, a magnet passing through the coils will induce an electromotive force displaying a trace on the oscilloscope similar to that shown in FIG. 6. This trace is the resultant of the superposition of the electromotive force induced in each coil. The separation between the coils is varied until a maximum trough deflection is obtained. In this position, the falling magnet is inducing a maximum electromotive force in each coil at the same time. By noting the corresponding distance between the coils and the length of the magnet, the relative position of the magnet and coil when a maximum electromotive force is being induced, can be determined. The location on the magnet when the maximum electromotive force is induced should be marked, and the magnet always dropped with this mark aligned with reference point 80.

It should be noted that the electromotive forces induced by the same end of the falling magnet are being compared, consequentially care should be taken to release the magnet each time with the same end pointing downward.

To determine the mathematical relationship between the velocity of a magnet and the electromotive induced in a coil, a single coil is moved to several positions along the tube guide by adjusting the grommet, and the amplitude of the oscilloscopic trace is noted each time the magnet is dropped. From the position of the coil, the free-fall distance of the magnet is found using indicia 30, and the velocity is computed by the above formula. Plotting a graph of the electromotive force versus the square root of the free-fall distance, the relationship is found to be linear. (FIG. 8).

The electromotive force induced in a coil by a first magnet having a first magnetic field strength, can be compared to the electromotive force induced in the same coil by a second magnet having a second magnetic field strength. The two magnets 75 and 76, are dropped, one at a time, through tube 24. The amplitudes of the traces displayed on the screen, indicating the electromotive forces induced in the coil, are noted. Interpretation of the results will reveal that the electromotive force increases as the magnetic field strength increases.

Lenz's law can be experimentally shown through the application of the principle of the conservation of energy. As is well known, Lenz's law states, that "the electromotive force induced in a secondary circuit is such as to send a current in the secondary circuit in a direction to oppose the change in the magnetic field which produces it."

The experiment is conducted by using a test coil, at a fixed position, to determine the relative velocity of the magnet. The magnet is dropped through the guide tube and the test coil and the maximum amplitude of the trace is noted. Subsequently, the continuous copper pipe 90 is placed over the guide tube, directly above the coil, and the magnet is again dropped. The amplitude of the trace is again noted and found to be of a smaller magnitude than when the magnet was dropped without the copper pipe. Since the electromotive force indicated by the amplitude of the trace is directly proportional to the magnet's velocity, the smaller amplitude indicates that the magnet passed through the guide tube at a lower velocity. This loss of velocity is due to the induced electromotive force in the pipe which produces a current therein having a direction such that its magnetic field opposes the change in the magnetic field causing it. The well-known principle of conservation of energy is applied, and the result is a demonstration of Lenz's law for the direction of an induced current.

In connection with the experiment related to Lenz's law, two minor observations may be made. A copper pipe 92 having dimensions similar to those of the pipe used in the immediately preceding experiment, but with a slit 94 along its length, may be placed over the glass tube and the amplitude of the trace noted. This trace should be compared to the trace developed using the pipe without the slit. Further, solenoid 96 having a length equal to the length of the copper tube may be placed about the glass tube. The oscilloscopic trace with and without the solenoid may be compared, and theories formulated regarding the phenomena.

Several secondary experiments may be conducted with the described apparatus. The first of the secondary experiments involves the determination of the value of gravity which, as is well known, is equal to $V^2/2H$, wherein H represents the distance from the center of the coil to the center of the magnet before it was released. In conducting this experiment, the time interval between the top of the crest and the bottom of the trough of the curve trace shown in FIG. 1 is calculated by calibrating the sweep rate of the oscilloscope and carefully observing or photographing the trace. In the previous experiments, the relative positions of the magnet and the coil when the maximum electromotive force was induced, was determined. Thus, the distance the magnet travels between the maximum and minimum electromotive force can be easily determined. The average velocity of the magnet as it passes through the coil may be calculated by dividing the distance of travel by the time. The result is inserted into the aforementioned formula to experimentally obtain the value of gravity.

A further secondary experiment relates to the superposition of wave pulses. This may be shown by providing an ascilloscope with an external triggering coil, and connecting two additional coils serially below the triggering coil. The signal from the two coils being tested is first shown separately and subsequently shown when the coils are serially connected, the resulting trace being a result of the super position of the individual traces.

Another experiment may be conducted by varying the diameter of the test coils while maintaining the number of coil wire turns constant. Coils Nos. 49, 50 and 51 may be used for this experiment, each of the coils being placed one at a time on grommet 72 and the amplitude of the trace on the oscilloscope being noted each time magnet 75 is dropped.

What has been described is apparatus for demonstrating various principles of electromagnetic induction, and a method of conducting several experiments related thereto.

It is obvious that upon study of those skilled in the art, the disclosed invention may be altered or modified both in physical appearance and construction without department from its inventive concept. Therefore, the scope of protection to be given this invention should not be limited by the embodiment described above, but should be determined by the essential descriptions thereof which appear in the appended claims.

The embodiment of the invention in which an exclusive property or privilege is claimed are defined as follows:

1. Experimental apparatus for demonstrating principles of electromagnetic induction comprising:
   (a) secondary circuit means comprising a plurality of individual test coils each having a differing number of wire turns;
   (b) magnetic field means comprising a permanent magnet having a given flux density;
   (c) means establishing relative movement between said magnet and said secondary circuit means for inducing an electromotive force therein;
   (d) said means comprising the force of gravity acting on the magnet for moving said magnet relative to each of said test coils, one at a time, at a given substantially equal velocity, for determining the relationship between the induced electromotive force and the number of test coil wire turns;

(e) guide means comprising a vertically oriented tubular member fabricated of magnetically nonpermeable material for guiding said magnet therethrough;
    (1) said test coils being adapted for support by said guide means at a selected position;

and wherein:

said magnet being dropped from a reference point through said tubular member and into electromagnetic inducing relationship with each individual test coil, one at a time, and attaining a gravity determinative substantially constant velocity upon inducing said electromotive force in the coil being tested; and means coupled to said secondary circuit means for indicating the electromotive force induced therein for determining relationships between said electromotive force and said circuit means, said magnetic field means and the relative movement therebetween.

2. The experimental apparatus as set forth in claim 1 wherein:
   (a) each of said test coils is toroidal shaped and mounted over said guide tubes, said magnet passing through said tube and said coil being tested;
   (b) and said means for indicating the induced electromotive force comprises an oscilloscope.

3. The experimental apparatus as set forth in claim 1 including additionally:
   (a) means for varying the free-fall distance through which said magnetic field means passes from a point of release to said test coil;

whereby said magnetic field means attains a mathematically computable velocity based upon the force of gravity and the free-fall distance for determining the relationship between the electromotive force induced in a coil and the rate of change of the flux density passing therethrough.

4. Experimental apparatus for demonstrating principles of electromagnetic induction comprising:
   (a) secondary circuit means comprising a plurality of individual toroidal shaped wire wound test coils each having a different coil diameter but the identical number of wire turns;
   (b) magnetic field means comprising a permanent magnet having a given flux density;
   (c) means establishing relative movement between said magnet and said secondary circuit means for inducing an electromotive force therein;
   (d) said means comprising the force of gravity acting on the magnet for moving said magnet field means through each of said test coils, one at a time, at substantially equal velocities for determining the relationship between the induced electromotive force and the coil diameter;
   (e) guide means comprising a vertically oriented tubular member fabricated of magnetically nonpermeable material for guiding said magnet therethrough:
      (1) said test coils being adapted for support by said guide means at a selected position;

and wherein:

said magnet being dropped from a reference point through said tubular member and into electromagnetic inducing relationship with each individual test coil, one at a time, and attaining a gravity determinative substantially constant velocity upon inducing said electromotive force in the coil being tested; and means coupled to said secondary circuit means for indicating the electromotive force induced therein for determining relationships between said electromotive force and said circuit means, said magnetic means and the relative movement therebetween.

References Cited

UNITED STATES PATENTS 1,692,723   11/1928   Downs _____ 46—234 X
2,045,769    6/1936   Geffcken.

OTHER REFERENCES

Welch Scientific Co., 1940 Catalogue Physical Chemical and Biological Supplies, copy Science Library, page 176 only.

Welch Scientific Apparatus and Supplies, received Science Library October 1965, pp. 173, 208, 213 only.

HARLAND S. SKOGQUIST, Primary Examiner